US008423957B2

(12) United States Patent
Presland

(10) Patent No.: US 8,423,957 B2
(45) Date of Patent: *Apr. 16, 2013

(54) USING THE Z/OS LOAD MODULE SYSTEM STATUS INDEX TO DISTINGUISH PRODUCT TAG FILES

(75) Inventor: Mark D. Presland, Murdoch, WA (US)

(73) Assignee: International Business Machines Corporation, Armonk, NY (US)

( * ) Notice: Subject to any disclaimer, the term of this patent is extended or adjusted under 35 U.S.C. 154(b) by 836 days.

This patent is subject to a terminal disclaimer.

(21) Appl. No.: 12/540,912

(22) Filed: Aug. 13, 2009

(65) Prior Publication Data

US 2011/0040765 A1 Feb. 17, 2011

(51) Int. Cl.
*G06F 9/44* (2006.01)
(52) U.S. Cl.
USPC .......................................... 717/120; 717/101
(58) Field of Classification Search .......... 717/101–103, 717/120–123
See application file for complete search history.

(56) References Cited

U.S. PATENT DOCUMENTS

| 5,579,509 A | 11/1996 | Furtney et al. |
| 6,249,782 B1 | 6/2001 | Day et al. |
| 2011/0041119 A1* | 2/2011 | Presland ...................... 717/120 |

FOREIGN PATENT DOCUMENTS

WO WO 2007131190 11/2007

* cited by examiner

*Primary Examiner* — Ted T Vo
(74) *Attorney, Agent, or Firm* — Hamilton & Terrile, LLP; Stephen A. Terrile

(57) ABSTRACT

A method, system, and computer-usable medium are disclosed for managing software product information in a z/OS environment. Product information associated with a software product is determined and then processed to generate product tag information. A System Status Index (SSI) attribute is generated with a unique identifier signifying that the SSI attribute comprises SSI product tag information. The SSI product tag information is then associated with the SSI attribute with the unique identifier. The z/OS environment is then scanned for SSI attributes. Those SSI attributes comprising a unique identifier are processed to read their associated SSI product tag information. The product tag information is then processed to generate software product information, which is then stored in a repository of software product information.

20 Claims, 3 Drawing Sheets

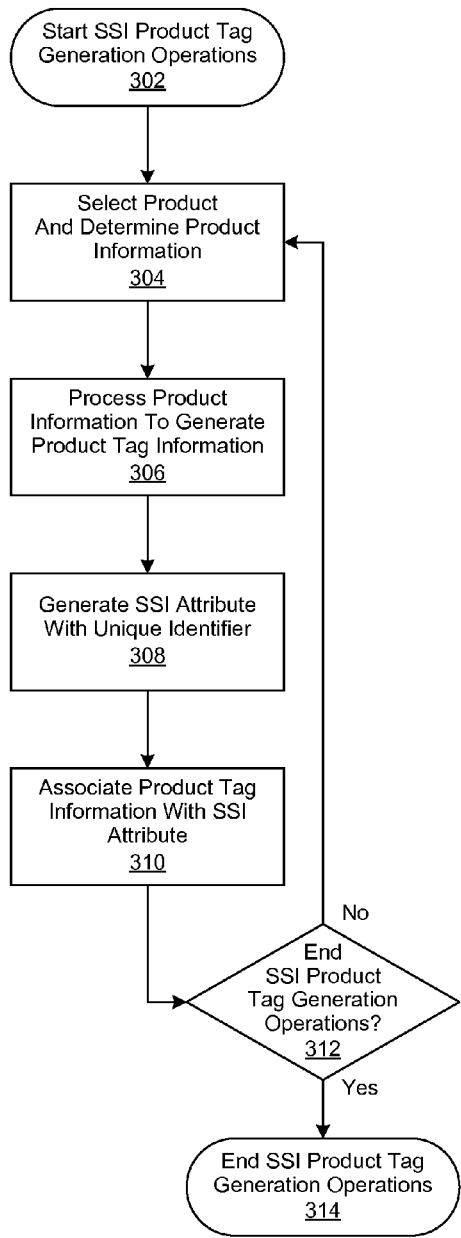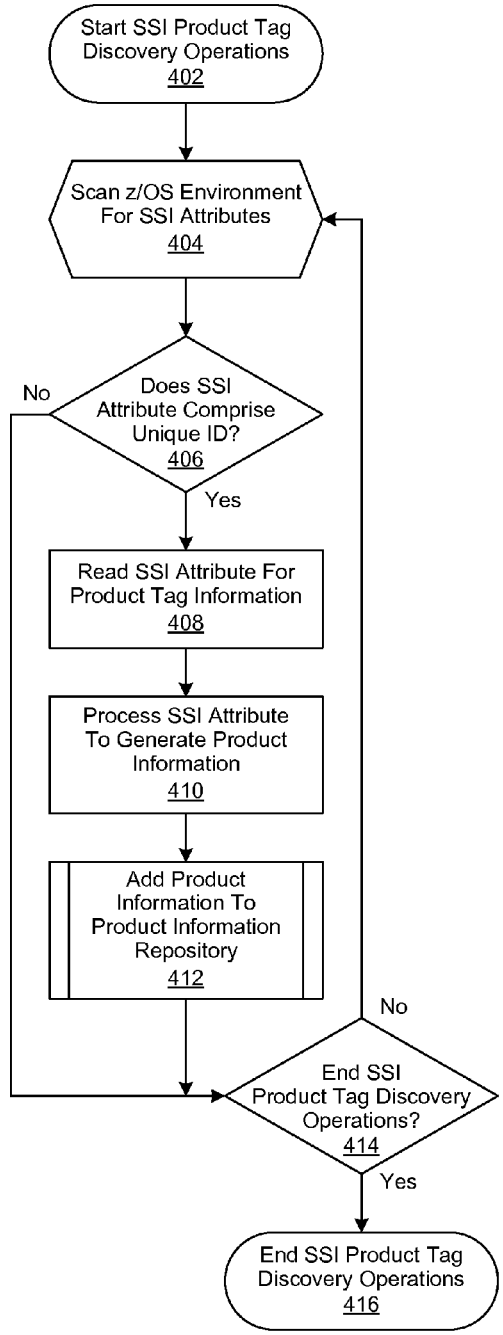
FIGURE 3   FIGURE 4

USING THE Z/OS LOAD MODULE SYSTEM STATUS INDEX TO DISTINGUISH PRODUCT TAG FILES

BACKGROUND OF THE INVENTION

1. Field of the Invention

Embodiments of the disclosure relate in general to the field of computers and similar technologies, and in particular to software utilized in this field. Still more particularly, it relates to the management of software product information in a z/OS environment.

2. Description of the Related Art

Mainframe computers continue to be used for processing large amounts of data, such as census information, industry and consumer statistics, and financial transactions. Current mainframe computers are not so much defined by their processing speed as by the redundancy of their internal design, extensive throughput capabilities, and backward compatibility with older software. One example of an operating system for mainframes is z/OS®, created by IBM®.

In a z/OS environment, software is contained within load libraries as load modules. The software products that are installed within a z/OS environment, and the respective usage of those products, are determined by scanning the contents of these libraries and the files they contain. In large z/OS environments, such scanning can take hours, if not days. The scanned load libraries and load modules, which are stored on one or more direct access storage devices (DASD), are then compared against a knowledge base (KB) of information associated with known products. The KB, which may be global (GKB) or local (LKB), contains various module attributes, such as module size and CSECT compile dates, which are used to determine the version and release information associated with each of the scanned products.

It is a common requirement for z/OS software auditing tools, such as Tivoli® License Compliance Manager for z/OS, to be able to capture product tag information (IBM, Tivoli, and z/OS are trademarks or registered trademarks of International Business Machines Corporation in the United States, other countries, or both). This can be done by reading load modules and searching for the required product tag information. However, implementing hard-coded tag file names is not always a viable approach, such as when merging multiple target libraries into the same run-time library. When this happens, tag information may be lost or corrupted during the merge process. In view of the foregoing, it will be apparent that there is a need for an improved approach to product identification in a z/OS environment.

BRIEF SUMMARY OF THE INVENTION

The present invention includes, but is not limited to, a method, system, and computer-usable medium for managing software product information in a z/OS environment. In various embodiments, product information associated with a software product is determined and then processed to generate SSI product tag information. A System Status Index (SSI) attribute is generated with a unique identifier signifying that the SSI attribute comprises SSI product tag information. As an example, the unique identifier of the SSI may be set to x'D7E3C1C7', which in EBCDIC is 'PTAG'. The SSI product tag information is then associated with the SSI attribute with the unique identifier.

The z/OS environment is then scanned for SSI attributes. Those SSI attributes comprising a unique identifier are processed to read their associated SSI product tag information. The product tag information is then processed to generate software product information, which is then stored in a repository of software product information. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which:

FIG. 3 is a flowchart of the operation of a SSI product tagging module for generating product tag information in a z/OS environment; and FIG. 4 is a flowchart of the operation of a SSI product tagging module for discovering product tag information in a z/OS environment.

DETAILED DESCRIPTION

Figure 1:
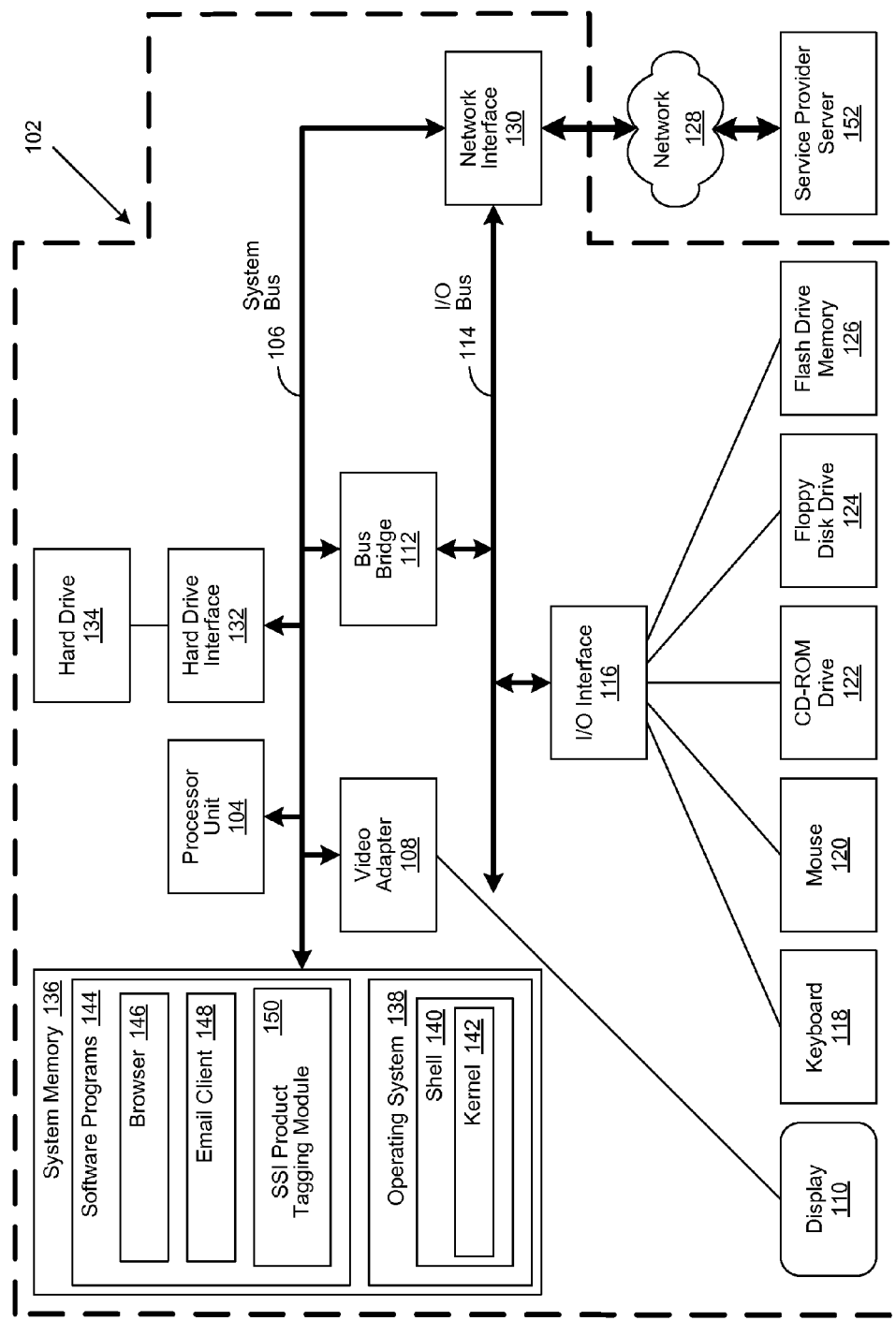
FIG. 1 depicts an exemplary client computer in which the present invention may be implemented.

A method, system, and computer-usable medium are disclosed for managing software product information in a z/OS environment. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java™, Smalltalk, C++ or the like (Java and all Java-based trademarks and logos are trademarks of Sun Microsystems, Inc. in the United States, other countries, or both). However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 as it is called in UNIX® (UNIX is a registered trademark of The Open Group in the United States and other countries), also called a command processor in Windows® (Windows is a trademark of Microsoft Corporation in the United States, other countries, or both), is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a SSI Product Tagging Module 150. The SSI Product Tagging Module 150 includes code for implementing the processes described in FIGS. 2 through 4 described hereinbelow. In one embodiment, client computer 102 is able to download the SSI Product Tagging Module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
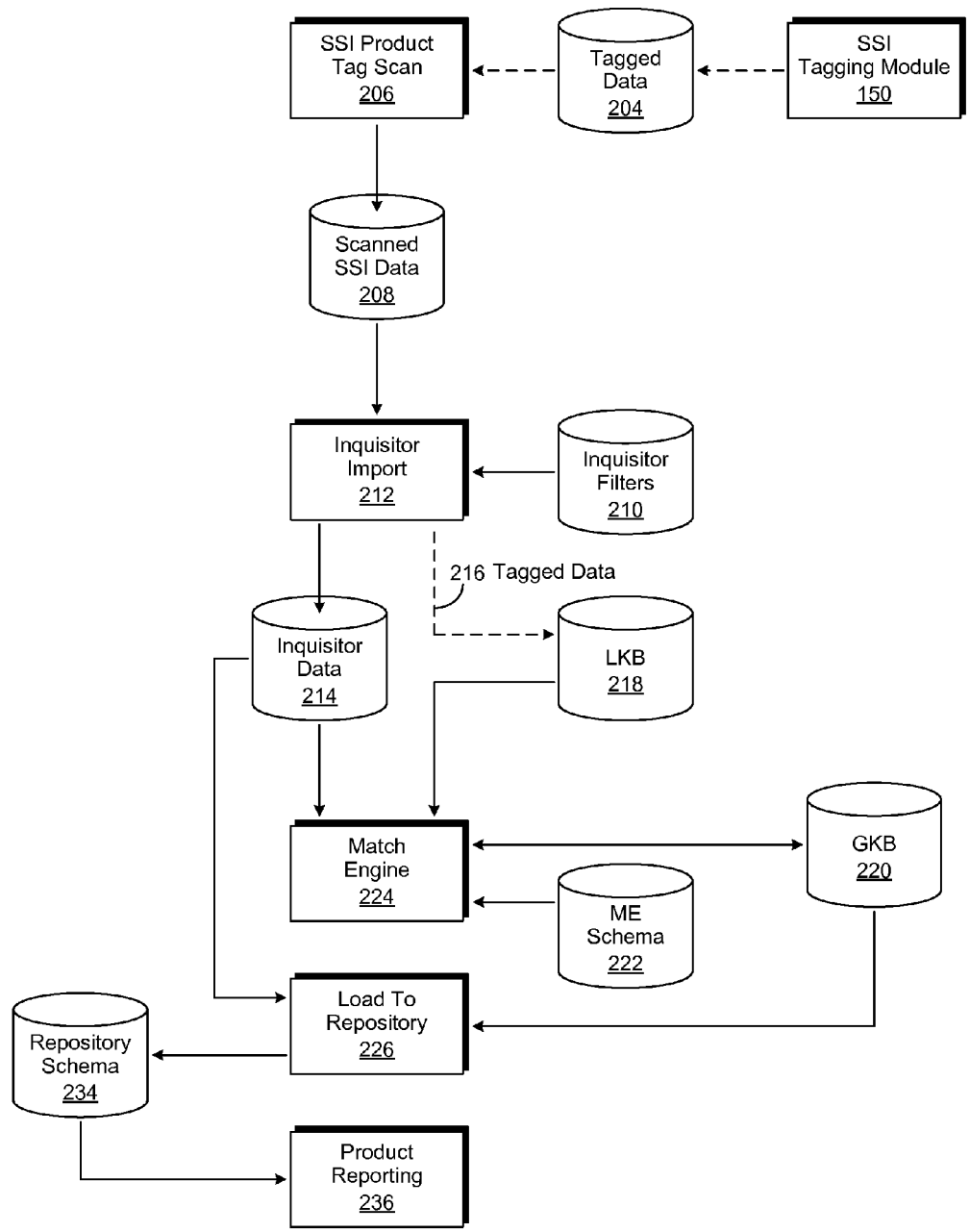
FIG. 2 shows a simplified block diagram of the operation of a System Status Index (SSI), product tagging module in a z/OS environment.

FIG. 2 shows a simplified block diagram of the operation of a System Status Index (SSI), product tagging module in a z/OS environment. In various embodiments, a SSI product tagging module is implemented in a z/OS environment to manage software product information. In this embodiment, a product tagging module 150 selects tagged data 204 and performs a SSI product tag scan 206 to generate scanned SSI product tag data 208, which is then imported by inquisitor import 212. In various embodiments, the SSI product tag data comprises a unique identifier which distinguishes the SSI attribute being associated with product tag information. As an example, the unique identifier of the SSI may be set by the SSI product tagging module to x'D7E3C1C7', which in EBCDIC is 'PTAG', to signify that the SSI comprises "product tag" information. In these and other embodiments, the inquisitor import 212 comprises a set of programs that load the imported SSI product tag data into a database processing for subsequent processing as software product information. Inquisitor filters 210 are used by the inquisitor import 212 to generate both inquisitor data 214 and SSI tagged product information 216, which is stored in a Local Knowledge Base (LKB) 218 as LKB data. The inquisitor data 214 and the LKB data 218 are then compared to product information and other data stored in a Global Knowledge Base (GKB) 220 by a match engine 224, which references a match engine schema 222 to perform the comparison operations. The result of the comparison operations performed by the match engine 224 is reconciled product information, which is in turn loaded, with the aforementioned inquisitor data 214, into a product information repository 234 by a load-to-repository process 226. In various embodiments, the product information repository 234 may independently or jointly comprise LKB 218 and GKB 220. Various product information reporting 236 processes then access the product information repository 234 for reporting purposes. It will be apparent to skilled practitioners of the art that many such embodiments are possible for the collection and reconciliation of SSI tagged software product information in a z/OS environment and the foregoing is not intended to limit the spirit, scope or intent of the present invention.

FIG. 3 is a flowchart of the operation of a SSI product tagging module for generating SSI product tag information in a z/OS environment. In this embodiment of the invention, SSI product tag generation operations are begun in step 302, followed by the selection of a software product for tagging in step 304. Product information associated with the selected software product is then determined in step 306. In various embodiments, the product information may comprise software version numbers, release dates, license information, and a variety of module attributes, such as module size, compile dates, and Control Section (CSECT) dates.

An SSI attribute with a unique identifier is then generated in step 308. In various embodiments, the unique identifier signifies that the SSI attribute comprises SSI product tag information. As an example, the unique identifier of the SSI may be set by the SSI product tagging module to x'D7E3C1C7', which in EBCDIC is 'PTAG'. Then, in step 310, the product tag information is then associated with the SSI attribute generated in step 308. A determination is then made in step 312 whether to end SSI product tag generation operations. If not, then the process is continued, proceeding with step 304. Otherwise, product tag generation operations are ended in step 314.

FIG. 4 is a flowchart of the operation of a SSI product tagging module for discovering product tag information in a z/OS environment. In this embodiment of the invention, SSI product tag discovery operations are begun in step 402, followed by scanning a z/OS environment for SSI attributes. A determination is then made in step 406 whether an SSI attribute comprises a unique identifier signifying that it comprises SSI product tag information. If not, a determination is made in step 414 whether to end SSI product tag discovery operations. If not, then the process is continued, proceeding with step 404. Otherwise, product tag discovery operations are ended in step 416.

However, if it is determined in step 406 that the SSI attribute comprises a unique identifier, then product tag information is read from the SSI attribute is read in step 408 and then processed in step 410 to generate software product information. The resulting software product information is then added to a product information repository in step 412, and a determination is made in step 414 whether to end SSI product tag discovery operations. If not, then the process is continued, proceeding with step 404. Otherwise, product tag discovery operations are ended in step 416.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for managing software product information, comprising:
   selecting a software product in a z/OS environment;
   determining product information associated with the software product;
   processing the product information to generate product tag information;
   generating a System Status Index (SSI) attribute;
   associating the product tag information with the SSI attribute;
   scanning the z/OS environment to discover the SSI attribute;
   determining whether an SSI attribute comprises a unique identifier, the unique identifier signifying that the SSI attribute comprises SSI product tag information; and
   reading product tag information from the SSI attribute if the SSI attribute comprises the unique identifier, wherein the product tag information is used to generate software product information.

2. The method of claim 1, wherein the unique identifier distinguishes the SSI attribute being associated with the product tag information.

3. The method of claim 2, wherein SSI attributes comprising the unique identifier are processed to generate the plurality of software product information stored in the repository.

4. The method of claim 1, further comprising:
   ending the scanning of the z/OS environment if an SSI attribute comprising the unique identifier is not discovered.

5. The method of claim 1, further comprising:
   storing the product tag information associated with the SSI attribute in a repository of software product information.

6. The method of claim 5, wherein the repository comprises at least one of a Local Knowledge Base (LKB) and a Global Knowledge Base (GKB).

7. A system comprising:
   a processor;
   a data bus coupled to the processor; and
   a computer-usable medium embodying computer program code, the computer-usable medium being coupled to the data bus, the computer program code managing software product information and comprising instructions executable by the processor and configured for:
   selecting a software product in a z/OS environment;
   determining product information associated with the software product;
   processing the product information to generate product tag information;
   generating a System Status Index (SSI) attribute;
   associating the product tag information with the SSI attribute;
   scanning the z/OS environment to discover the SSI attribute;
   determining whether an SSI attribute comprises a unique identifier, the unique identifier signifying that the SSI attribute comprises SSI product tag information; and
   reading product tag information from the SSI attribute if the SSI attribute comprises the unique identifier, wherein the product tag information is used to generate software product information.

8. The system of claim 7, wherein the unique identifier distinguishes the SSI attribute being associated with the product tag information.

9. The system of claim 8, wherein SSI attributes comprising the unique identifier are processed to generate the plurality of software product information stored in the repository.

10. The system of claim 7, further comprising:
    ending the scanning of the z/OS environment if an SSI attribute comprising the unique identifier is not discovered.

11. The system of claim 7, further comprising:
    storing the product tag information associated with the SSI attribute in a repository of software product information.

12. The system of claim 11, wherein the repository comprises at least one of a Local Knowledge Base (LKB) and a Global Knowledge Base (GKB).

13. A non-transitory computer-usable medium embodying computer program code, the computer program code comprising computer executable instructions configured for:
    selecting a software product in a z/OS environment;
    determining product information associated with the software product;
    processing the product information to generate product tag information;
    generating a System Status Index (SSI) attribute;
    associating the product tag information with the SSI attribute;
    scanning the z/OS environment to discover the SSI attribute;
    determining whether an SSI attribute comprises a unique identifier, the unique identifier signifying that the SSI attribute comprises SSI product tag information; and
    reading product tag information from the SSI attribute if the SSI attribute comprises the unique identifier, wherein the product tag information is used to generate software product information.

14. The non-transitory computer usable medium of claim 13, wherein the unique identifier distinguishes the SSI attribute being associated with the product tag information.

15. The non-transitory computer usable medium of claim 14, wherein SSI attributes comprising the unique identifier are processed to generate the plurality of software product information stored in the repository.

16. The non-transitory computer usable medium of claim 13, further comprising:
    ending the scanning of the z/OS environment if an SSI attribute comprising the unique identifier is not discovered.

17. The non-transitory computer usable medium of claim 13, further comprising:
    storing the product tag information associated with the SSI attribute in a repository of software product information.

18. The non-transitory computer usable medium of claim 17, wherein the repository comprises at least one of a Local Knowledge Base and a Global Knowledge Base (GKB).

19. The non-transitory computer usable medium of claim 13, wherein the computer executable instructions are deployable to a client computer from a server at a remote location.

20. The non-transitory computer usable medium of claim 13, wherein the computer executable instructions are provided by a service provider to a customer on an on-demand basis.

* * * * *